United States Patent [19]
Geoffrey

[11] Patent Number: 5,792,802
[45] Date of Patent: Aug. 11, 1998

[54] BIPHENYL ADDITIVE FOR IMPROVEMENT IN URETHANE FOUNDRY BINDERS

[75] Inventor: Michael M. Geoffrey, Lombard, Ill.

[73] Assignee: Borden Chemical, Inc., Columbus, Ohio

[21] Appl. No.: 509,601

[22] Filed: Jul. 31, 1995

Related U.S. Application Data

[62] Division of Ser. No. 285,108, Aug. 3, 1994.

[51] Int. Cl.$^6$ ............................................. C08K 5/01
[52] U.S. Cl. .................... 523/143; 523/142; 524/471; 524/486; 524/507
[58] Field of Search ........................ 523/143, 142; 524/507, 471, 486

[56] References Cited

U.S. PATENT DOCUMENTS

| | | | |
|---|---|---|---|
| 2,115,524 | 4/1938 | Hochwalt | 524/352 |
| 2,172,391 | 9/1939 | Krase | 585/25 |
| 2,291,988 | 8/1942 | Sibley | 524/471 |
| 2,449,928 | 9/1948 | Corkery | 524/486 |
| 2,945,832 | 7/1960 | Dazzi | 524/297 |
| 4,293,480 | 10/1981 | Martin et al. | 523/143 |
| 4,294,742 | 10/1981 | Rugen et al. | 524/569 |
| 4,336,342 | 6/1982 | Dunnavant | 523/144 |
| 4,396,526 | 8/1983 | Woodson | 252/186.22 |
| 4,546,124 | 10/1985 | Laitar et al. | 523/143 |
| 5,189,079 | 2/1993 | Geoffrey et al. | 523/142 |
| 5,264,535 | 11/1993 | Geoffrey | 528/133 |
| 5,489,646 | 2/1996 | Tatman et al. | 524/848 |

OTHER PUBLICATIONS

European Search Report, The Hague, Jul. 25, 1996.
Koch Specialty Chemical Company Group, Organic Chemical Products (Undated Brochure relating to Sure Sol® Products, etc./Received by counsel Jun. 1994).

*Primary Examiner*—Vasu Jagannathan
*Assistant Examiner*—John J. Guarriello
*Attorney, Agent, or Firm*—Watson Cole Stevens Davis, P.L.L.C.

[57] ABSTRACT

Compositions and methods for improving the characteristics of foundry cores which includes adding to the foundry aggregate mixture one or more biphenyl compounds.

2 Claims, 5 Drawing Sheets

BIPHENYL ADDITIVE FOR IMPROVEMENT IN URETHANE FOUNDRY BINDERS

This is a division of application Ser. No. 08/285,108, filed Aug. 3, 1994.

FIELD OF THE INVENTION

This invention relates to the use of biphenyl compounds in urethane foundry binders as a direct additive to the binder or as a substitute for a portion of a conventional plasticizer or solvent or both. Plasticizers and solvents are presently used to affect performance properties of these binders, such as reactivity and resistance to moisture, and to promote performance aspects of the cured core or mold, such as strength, release from a core or mold box, and resistance to moisture.

BACKGROUND OF THE INVENTION

Binders or binder systems for foundry cores and molds are well known. In the foundry art, cores or molds for making metal castings are normally prepared from a mixture of an aggregate material, such as sand, and a binding amount of a binder system. Typically, after the aggregate material and binder have been mixed, the resultant mixture is rammed, blown or otherwise formed to the desired shape or patterns, and then cured with the use of catalyst and/or heat to a solid, cured state.

Resin binders used in the production of foundry molds and cores are often cured at high temperatures to achieve the fast-curing cycles required in foundries. However, in recent years, resin binders have been developed which cure at a low temperature, to avoid the need for high-temperature curing operations which have higher energy requirements and which often result in the production of undesirable fumes.

One group of processes which do not require heating in order to achieve curing of the resin binder are referred to as "cold-box" processes. In such processes, the binder components are coated on the aggregate material, such as sand, and the material is blown into a box of the desired shape. Curing of the binder is carried out by passing a gaseous catalyst at ambient temperatures through the molded resin-coated material. Where such processes use urethane binders, the binder components comprise a polyhydroxy component and a polyisocyanate component. These cure to form a polyurethane in the presence of a gaseous amine catalyst.

Another group of binder systems which do not require gassing or heating in order to bring out curing are known as "no-bake" systems. No-bake systems based on the use of urethane binders use an aggregate material, such as sand, coated with a polyhydroxy component and a polyisocyanate component. In this case, a liquid tertiary amine catalyst is combined with the polyhydroxy component at the time of mixing and the mixed aggregate and binder is allowed to cure in a pattern or core box at ambient or slightly higher temperatures.

As alluded to above, the binder for the urethane cold-box or no-bake systems is a two-part composition. Part one of the binder is a polyol (comprising preferably hydroxy containing phenol formaldehyde resin) and part two is an isocyanate (comprising preferably polyaryl polyisocyanates). Both parts are in a liquid form and are generally used in combination with organic solvents. To form the binder and thus the foundry sand mixture, the polyol part and the isocyanate part are combined. After a uniform mixture of the foundry sand and parts one and two is achieved, the foundry mix is formed or shaped as desired. Parts one and/or two may contain additional components such as, for example, mold release agents, plasticizers, inhibitors, etc.

Liquid amine catalysts and metallic catalysts, known in the urethane technology, are employed in a no-bake composition. The catalyst may be incorporated into either part one or two of the system or it may be added after uniform mixing as a part three. By selection of a proper catalyst, conditions of the core making process, for example, work-time (assembling and admixing components and charging the admixture to a mold) and strip time (removing the molded core from the mold) can be adjusted.

In cold-box technology, the curing step is accomplished by suspending a tertiary amine catalyst in an inert gas stream and passing the gas stream containing the tertiary amine, under sufficient pressure to penetrate the molded shape until the resin is cured.

Improvements in resinous binder systems which can be processed according to the cold-box or no-bake process generally arise by modifying the resin components, i.e., either the polyol part or the isocyanate part. For instance, U.S. Pat. No. 4,546,124, which is incorporated herein by reference, describes an alkoxy modified phenolic resin as the polyhydroxy component. The modified phenolic resin improves the hot strength of the binder systems. U.S. Pat. No. 5,189,079, which is herein incorporated by reference, discloses the use of a modified resole resin. These resins are desired because they emit reduced amounts of formaldehyde. U.S. Pat. No. 4,293,480, herein incorporated by reference, relates to improvements in the isocyanate component which enhances shake-out properties of non-ferrous castings.

The present invention, on the other hand, relates to improving the binder system by using a substitute compound for a portion of the conventionally used plasticizers or solvents.

SUMMARY OF THE INVENTION

In accordance with this invention, improvements in cold-box and no-bake binder systems are obtained by substituting one or more biphenyl compounds for a portion of the plasticizers/solvents currently used in such systems. The amounts of biphenyl compounds used as substitutes for a portion of the solvent/plasticizer in the foundry binder composition shows significant advantages over the prior art binder systems. These advantages include, for the urethane cold-box system, a surprising humidity resistance, and an improved hot strength and improved release, with little or no impact on tensile strength, and bench life of the mixed foundry sand. Tensile strength and bench life of the cold-box system can be enhanced by properly selecting the level of addition of the biphenyl compound. When applied to the urethane no-bake system, these advantages include an improved hot strength and an improved release with no negative impact on tensile strength.

DETAILED DESCRIPTION OF THE INVENTION

Figure 1:
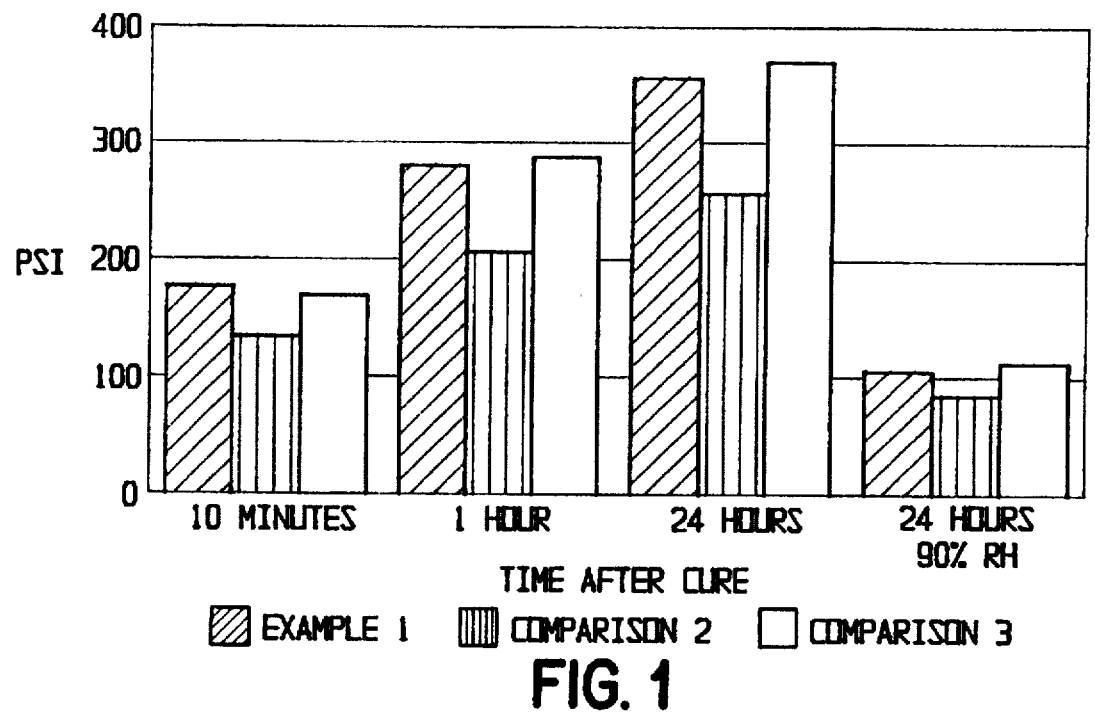
FIG. 1 shows that use of biphenyl compounds in a no-bake binder composition has essentially no impact on tensile strength.

As discussed above, both the phenolic (part one) and isocyanate components (part two) are dissolved in solvents in order to provide component solvent mixtures of desirable viscosity and to facilitate coating foundry aggregates with part one and part two binder components. In this respect, sufficient solvents are employed to provide a Brookfield viscosity of solutions of part one and part two components below about 1000 centipoises and preferably less than 500 centipoises.

Although the solvents employed in combination with either the polyol or the isocyanate components do not, to any significant degree, enter into the reaction between parts one and two, they can affect the reaction. Thus the difference in polarity between the isocyanate component and the polyol component restricts the choice of solvents (and plasticizers for that matter) in which both part one and part two components are compatible. Such compatibility is necessary to achieve complete reaction and curing of the binder compositions.

Conventional solvents used in the art to date are generally mixtures of hydrocarbons (for part one and part two components) and polar organic solvents (for part one components), such as organic esters. A solvent system may be composed of i) a single solvent with or without a plasticizer, or ii) a mixture of two or more solvents, with or without a plasticizer. Conventional hydrocarbon solvents include aromatic hydrocarbons such as benzene, toluene, xylene, ethylbenzene, naphthalene, and mixtures thereof. (See, for example, U.S. Pat. No. 4,293,480.) A particular naphthylene-based solvent, SURE SOL 205 contains biphenyl, per se (i.e., the compound phenylbenzene), in contaminant amounts or as an impurity, for example, in amounts of 1.7–2% by weight of the SURE SOL 205 mixture. Other aromatic solvents having similar boiling point ranges, or higher, may also contain biphenyl as an impurity. The conventional polar solvents are not extremely polar so as not to become incompatible when used in combination with the aromatic solvent. Suitable polar solvents used in the art generally include organic esters and mixtures thereof.

Applicant has now found that a biphenyl compound or a mixture of biphenyl compounds, when used as an additive per se or as a substitute for a portion or part of the solvent/plasticizer system improves both the release characteristics and the hot strength of both cold box and no-bake systems and the humidity resistance of the cold box system. Humidity is a concern to the formulator because its effect is to reduce the tensile strength of produced cores. The presence of water or water vapor can react with any unreacted isocyanate, thus producing a weak, undesirable chemical structure. Also the presence of water or water vapor can cause a drop in tensile strength of cured cores exposed to these conditions. The effect may even be insidious as other more easily measured parameters such as cure time, may not be influenced, thus providing the formulator with a false sense of security. Hundreds of cores may be produced before the affects of humidity become apparent. Accordingly, the ability to improve humidity resistance is a significant advance in the art. An improved hot strength allows for more uniform or better castings especially when dealing with hotter metal pours such as iron. These advantages are achieved without any significant negative effects.

The biphenyl compounds which can be used as part of or as substitutes for a portion of the solvent/plasticizer composition include a compound or mixtures of compounds represented by the following formula

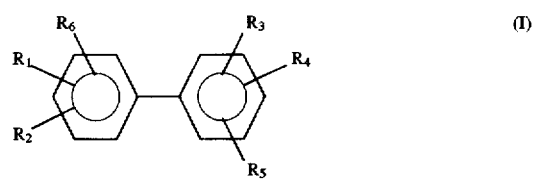

(I)

wherein $R_1$–$R_6$ which may be the same or different represent H, and $C_1$–$C_6$, preferably $C_1$–$C_4$, branched and unbranched alkyls and/or alkenyl substituents, with the proviso that when $R_1$–$R_6$ are each hydrogen (phenylbenzene), and when such a compound is present in contaminant or impure amounts, it is used in combination with another substituted biphenyl as defined above or as defined below in formula II.

More preferably the biphenyl substitute is a mixture of substituted lower alkyl ($C_1$–$C_6$) compounds. At the present time the best mode contemplated for the invention by the inventor is a composition comprising a mixture of compounds having di- and tri-substitution sold by Koch Chemical Company of Corpus Christi, Tex., as Sure-Solo® 300, which is a mixture of diisopropylbiphenyl and triisopropylbiphenyl compounds. The mixture is composed of compounds represented by the following formulae:

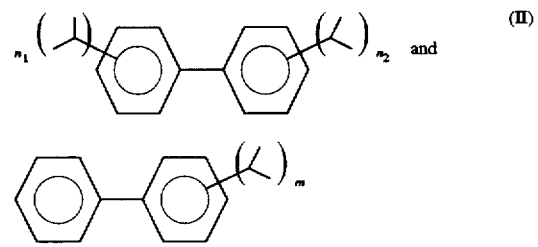

(II)

wherein $n_1$ and $n_2$ are equal to the number 1, 2, as long as the sum of $n_1$ and $n_2$ is 2 or 3, and m is equal to the number 2, 3, and for convenience the mixture is collectively referred to as formula II.

Product information relating to Sure-Sol® 300 is as follows:

| Characteristics | Test Method | SPECIFICATIONS | | |
|---|---|---|---|---|
| | | Min. | Max. | Typicals |
| Composition | | | | |
| Aromaticity, FIA, Wt. % | D-1319-77 | 98 | — | 98+ |
| Water, ppm | D-1744 | — | 150 | 75 |
| Total sulfur, ppm | D-3120 | — | 10 | 1 |
| Total chlorides, ppm | UOP-588 | — | 5 | <1 |
| $H_2S$ & $SO_2$ | D-853 | — | None | None |
| Acidity, mg KOH/g | D-847 | — | None | None |
| Volatility | | | | |
| Distillation, °F. | D-86 | | | |
| Initial Boiling Pt. | | 590 | — | 600 |
| End Point | | — | — | 650 |
| Flash Point, COC, °F. | D-92 | 320 | — | 330 |
| Fire Point, COC, °F. | D-92 | 360 | — | 380 |
| Solvency | | | | |
| Mixed Aniline Pt. °C. | D-611 | — | — | 16.4 |
| Kauri-Butanol | D-1133 | — | — | 59.7 |
| Flow Properties | | | | |
| Freeze Point, °F. | D-1015 | — | — | -26 |
| Pour Point, °F. | D-97 | — | 0 | -20 |
| Viscosity, cst. @ 100° F. | D-445 | — | 16.0 | 15.0 |
| Viscosity, cst. @ 210° F. | D-445 | — | — | 2.7 |
| General | | | | |
| Spec. Gravity, 60/60° F. | D-287 | 0.94 | 0.97 | 0.955 |
| Color, ASTM | D-1500 | — | 0.5 | <0.5 |
| Refractive Index, 20° C. | D-1218 | — | — | 1.5615 |

The biphenyl component of the invention which may include one or more biphenyl compounds can be used in amounts as high as 80% by weight of a part one or part two component. Currently, it is found that improved humidity resistance for cold box formulations can be obtained by using the biphenyl component in amounts of just 0.5–2% by weight of a part one or part two component. It is also found that amounts of about 10% and up to 80% by weight of biphenyl in a part one or part two component improves mold release properties of a finished composition containing the cured binder. Accordingly, the compounds of formulae (I) and (II) can be used in amounts of about 0.5–80% by weight of a part one or part two component as an additive or as a substitute for a portion of the presently used solvents/plasticizers. As a practical consideration the amount of biphenyl component used may ultimately depend on balancing economic factors with specific benefits desired. The biphenyl compounds are less expensive than currently used plasticizers and more expensive than the currently used solvents.

The compounds of formulae (I) and (II) may be used strictly as either a third part (or component) of a foundry binder system, or mixed with a sand composition prior to the inclusion of parts one and two of the binder system. The biphenyl compounds may also be added to foundry sand mixtures in conjunction with either parts one and two or both. The biphenyl component could be mixed with sand and sold or packaged as a mixture. For an improvement in release of the cold-box and no-bake systems, the preferred mode of application will be to incorporate the biphenyl component in amounts up to 80% of the part one and the part two components of the binder system. It is further anticipated that for an improvement in tensile strength performance, bench life performance, and humidity resistance of the cold-box system, the preferred mode of application will be to incorporate the biphenyl component in amounts greater than about 0.5% in the part one or part two components of the binder system.

As objective evidence of the properties of composition of the invention, the following examples, experiments, and data are presented. All percentages expressed in the Examples of the invention and comparisons are by weight unless otherwise specified.

EXAMPLE 1 AND COMPARISONS 2–3

Preparation of no-bake formulation

To a Kitchen Aid mixer was added 2500 g of silica sand. To a depression in the sand, on one side of the mixing bowl was added approximately 17.2 g of a modified phenolic resin solution, as disclosed in U.S. Pat. Nos. 5,189,079 and 5,264,534, incorporated herein by reference. This resin is a phenolic resole resin component wherein the preponderance of the bridges joining the phenolic nuclei are orth-ortho benzylic ether bridges and which has covalently bound into the resin an aliphatic hydroxy compound which contains two or more hydroxy groups per molecule and has a hydroxyl number of from about 200 to about 1850, the molar ratio of the hydroxy compound to phenol being from about 0.001:1 to 0.03:1. The resin is prepared by the reaction of a phenol, an aldehyde and an aliphatic hydroxy compound containing two or more hydroxy groups per molecule. To this resin solution was added 0.7 ml of a tertiary amine catalyst solution. Then approximately 14.1 g of a methylene biphenyl diisocyanate solution containing 71% by weight of the diisocyanate, 17% by weight of CIO aromatic isomers as a solvent, 10% by weight of mixed di- and tri-substituted biphenyls of formula II and 2% by weight of 2,2,4-trimethyl-1,3-pentanediol diisobutyrate plasticizer were added to a depression in the sand opposite that containing the part one and catalyst components. The sand was discharged from the mixer after mixing the sand and components for one minute. The sand was used immediately to form standard American Foundry Society 1-inch dog-bone tensile briquettes using a Dietert 12 gang core-box. The dog-bone briquettes or cores were cured at room temperature and cores were broken at 10 minute, 1 hour, and 24 hour cure times and at 24 hours cure time exposed to 90% relative humidity.

Two additional sets of dog-bone briquettes were obtained and prepared similar to the method described above except in Comparisons 2 and 3 the composition of the isocyanate solution was modified. In Comparison 2, 10% by weight glycerol trioleate was used instead of the biphenyl composition, and in Comparison 3 the solvent was composed of 27% by weight of an aromatic solvent; the biphenyl mixture was not included in Comparison 3.

Table 1 is a quick reference of the compositions of Examples 1–3.

TABLE 1

| No Bake Formulas | 1 (%) | 2 (%) | 3 (%) |
|---|---|---|---|
| Polymeric MDI[1] | 71 | 71 | 71 |
| Sure-Sol 150ND[2] (aromatic solvent) | 17 | 17 | 27 |
| Sure-Sol 300 | 10 | | |
| Glycerol Trioleate | | 10 | |
| TXIB[3] (plasticizer) | 2 | 2 | 2 |

[1]methylenebiphenyl diisocyanate
[2]$C_{10}$ aromatic isomers
[3]2,2,4-trimethyl-1,3-pentanediol diisobutyrate

TEST 1

FIG. 1 compares the tensile performance of the no-bake compositions of Example 1 and Comparisons 2–3. FIG. 1 shows that the substitution of 10% by weight amounts of a mixture of di- and tri-isopropyl substituted biphenyl compounds, for a portion of the conventional aromatic solvent in a part two component has essentially no impact on tensile strength over the range of curing for periods of ten minutes to 24 hours, and at a period of 24 hour exposure to a relative humidity of 90%.

TEST 2

Figure 2:
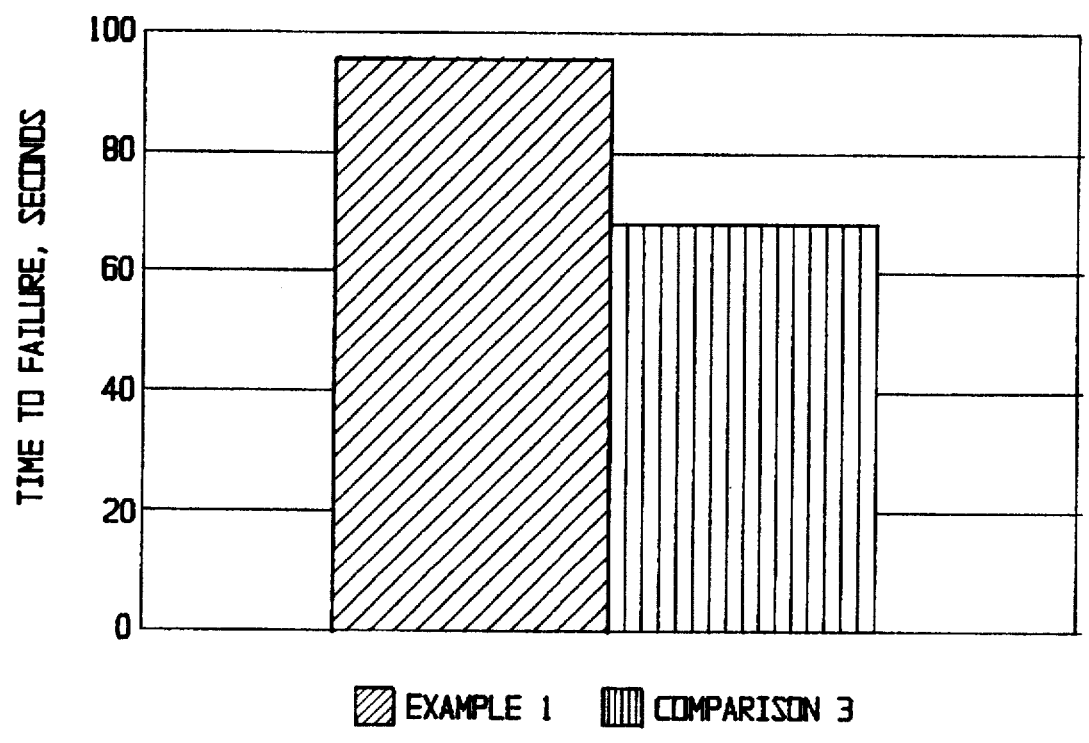
FIG. 2 shows a significantly higher hot strength for a no-bake binder composition containing biphenyl compounds.

In order to predict the hot strength of cores produced with the biphenyl components, sand compositions were reserved from the foundry mixture identified in Example 1 and Comparisons 2–3 and were formed into test strips 1"×¼"×4½". The strips were then subjected to BCIRA hot distortion comparisons approximately twenty-four hours after the strips were made. In this comparison, strips are clamped to a support in a cantilever position and strongly heated in the center of one face. Due to thermal expansion between the hot face and the opposite cold face, the strips curl away from the heat source. A load is applied to the free end of the strips opposite the direction of curl. Due to the thermoplastic nature of the bond, the bonded sand can no longer curl against the load, and reverse curling took place. After further decomposition, the bond completely loses strength and the test strips collapse. The longer the time to collapse or failure, the higher the thermal strength of the core. FIG. 2 shows bar graphs comparing the failure time of the conventional composition of Comparison 3 to the composition of Example 1 which contains substituted biphenyl compounds. The data clearly demonstrates a significantly longer time (28 percent longer) to failure for the system using a biphenyl component. The longer time to failure (a greater hot strength) is an advantage in making castings requiring greater temperatures, such as ferrous castings.

TEST 3

Figure 3:
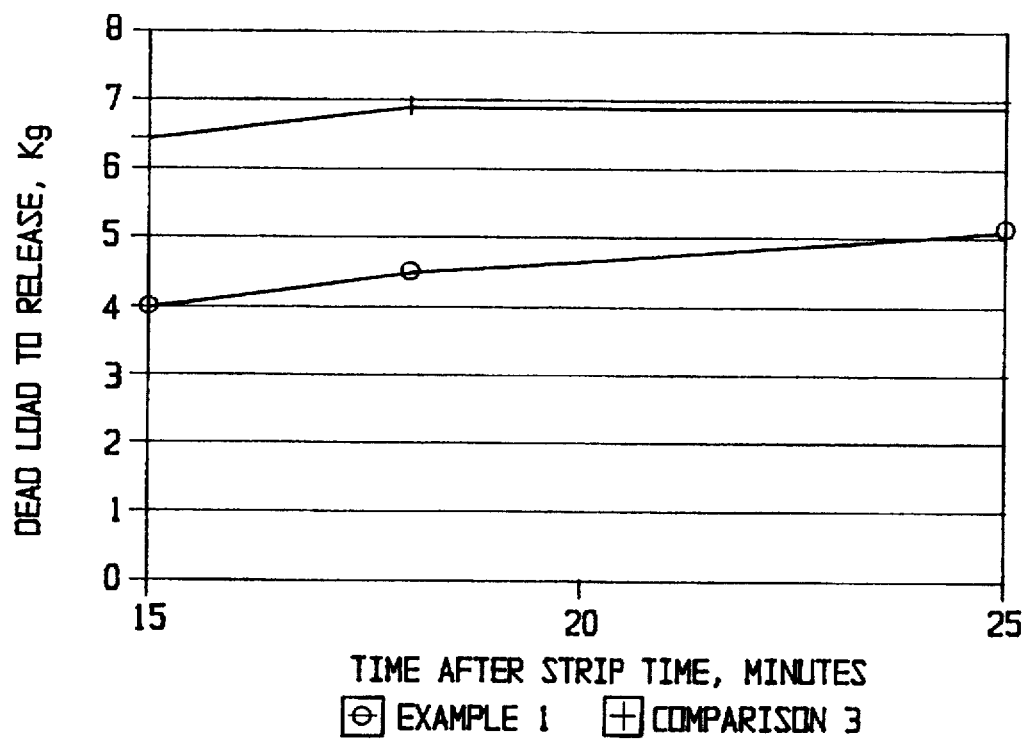
FIG. 3 compares the improved release characteristics of a core formed from the no-bake method using biphenyl compounds in the binder system.

The use of a biphenyl component also greatly improves the release characteristics of the urethane no-bake system. Generally, once a core or mold cures, the amount of force required to release the core or mold from the pattern increases as the core or mold ages. A simple test has been devised for identifying the force required to release a core. In this test, a sand mixture (with binder) is poured or injected into a metal tube having an inside diameter of 2" and a length of 4⅝", and allowed to cure. As a function of time after cure, the amount of weight required to push the core out of an end of the tube is measured. FIG. 3 compares the result of the release of the core prepared with the composition of Example 1 to the core produced with the composition of Comparison 3. From FIG. 3 it is shown that the dead weight release is approximately 50% less for the composition of Example 1 than it is for the composition of Comparison 3.

Figure 4:
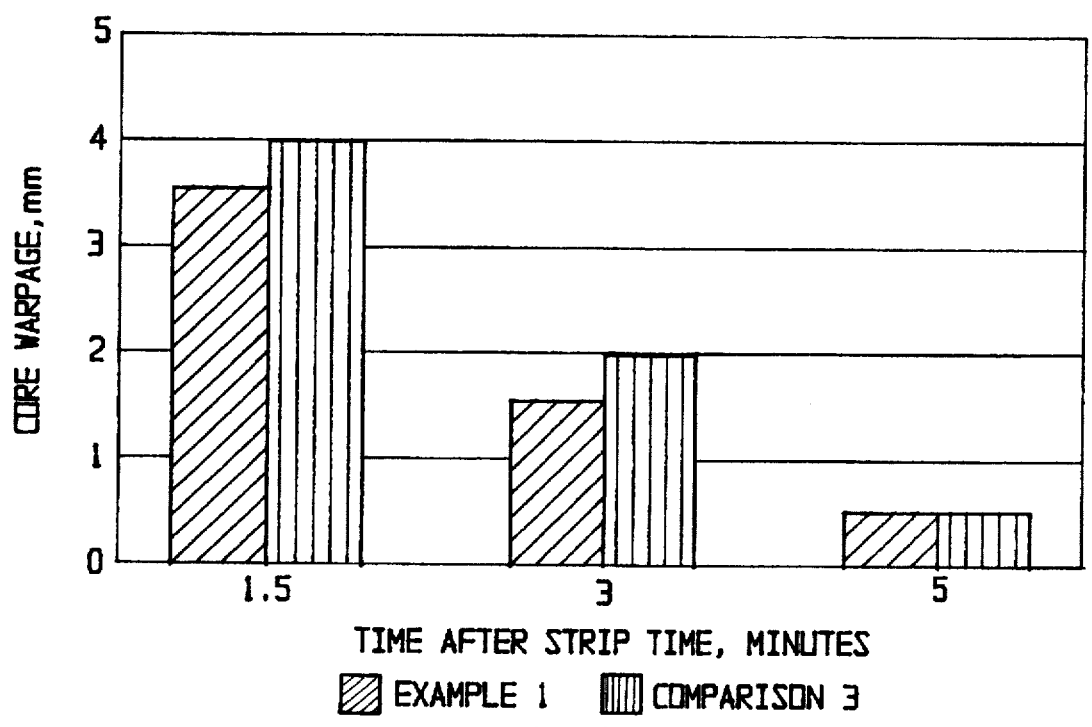
FIGS. 4 and 5 show that the use of biphenyl compounds in no-bake binder composition has no measurable impact on core warpage and gas evolution.
Figure 5:
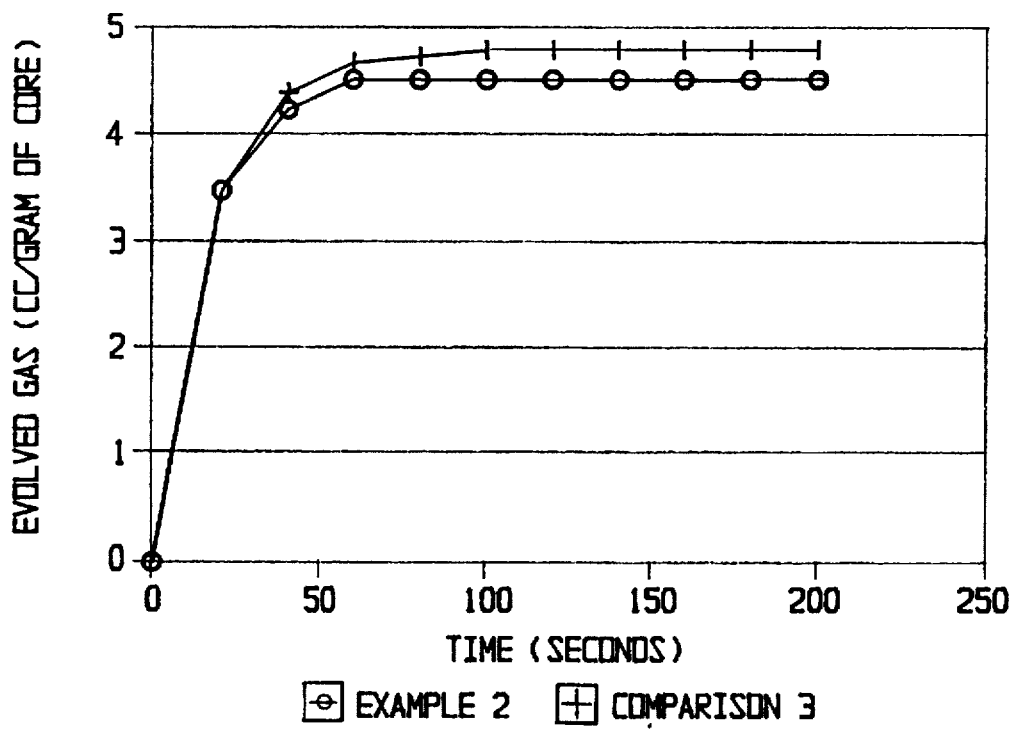

In addition to showing no detrimental effects on tensile strength the composition of Example 1 containing a biphenyl component has no measurable impact on core warpage or gassing as shown in FIGS. 4 and 5.

EXAMPLE 4 AND COMPARISONS 5–6

Cold-Box Formulations

To a Kitchen Aid mixer was added 2500 g of lake sand. The mixer was started and the phenolic resin described in Example 1 and a polymeric methylenebiphenyl diisocyanate solution containing 70.0% by weight of the diisocyanate, 19.3% of a mixed naphthalene solvent, 10.5% by weight of a mixture of di- and tri-isopropyl substituted biphenyls of formula (II) and 0.2% by weight of benzene phosphorous oxydichloride were added to the mixing of said mixture. The foundry mix was blown using a Redford CBT-1 core blower to form American Foundry Society 1-inch dog-bone tensile briquettes or cores. Cores were blown at 50 psi air pressure and gassed for three seconds with 12% dimethylethylamine in carbon dioxide at 30 psi and then for five seconds with purge air at 30 psi. Tensile strengths of the produced cores were measured as described above.

Two additional sets of dog-bone briquettes were obtained and prepared in a manner similar to that described above, except in Comparison 5 10.5% by weight of glycerol trioleate was substituted for the complete amount of the biphenyl component. In Comparison 6 a standard formulation was used containing 75% by weight of the diisocyanate, 17.4% by weight of the aromatic solvents, 6.5% by weight of kerosene, 0.7% by weight of benzene phosphorous oxydichloride and 0.4% by weight of silane.

Table II provides a quick reference of the composition of Example 4 and Comparison Compositions 5 and 6.

TABLE 2

|  | Example 4 (%) | Comparison 5 (%) | Comparison 6 (%) |
| --- | --- | --- | --- |
| Polymeric MDI[1] | 70.0 | 70.0 | 75.0 |
| Sure-Sol 205 (aromatic solvent)[4] | 19.3 | 19.3 | 17.4 |
| Sure-Sol 300 | 10.5 | | |
| Glycerol Trioleate | | 10.5 | |
| Kerosene | | | 6.5 |
| BPOD[5] (inhibitor) | 0.2 | 0.2 | 0.7 |
| Silane | | | 0.4 |

[1]methylenebiphenyl diisocyanate
[4]mixed methylnaphthalenes containing phenylbenzene as an impurity or contaminant in amounts of about 1.7–2% by weight of the SS 205 mixture
[5]benzene phosphorous oxydichloride

TEST 4

Figure 6:
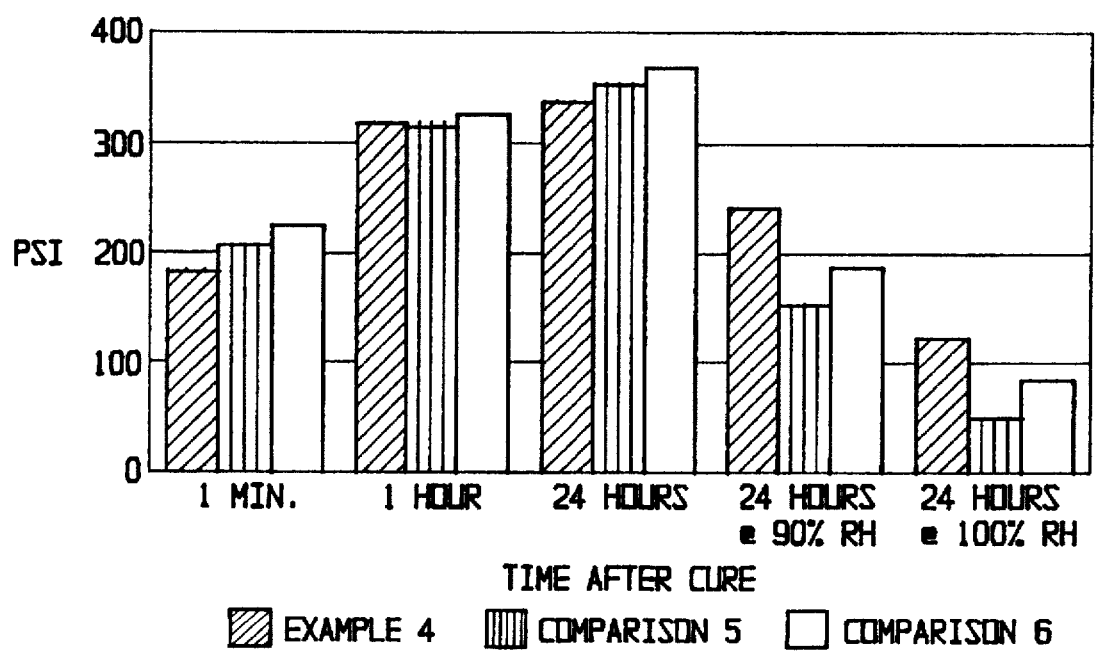
FIG. 6 shows that the use of biphenyl compounds in a cold-box binder composition exhibits improvements in tensile strength under elevated conditions of humidity.

FIG. 6 compares the tensile performance of the cold-box compositions of Example 4 and Comparisons 5 and 6. The results depicted by bar graphs in FIG. 6 are somewhat different from the results achieved with the no-bake systems. At one minute after cure, the graphs show that the conventional binder composition, i.e., the composition of Comparison 6 produced a product having a tensile strength 13.8% better than the product having biphenyls. The difference was less than 10% at one hour and at 24 hours cure age. However, it was surprisingly found that under conditions of elevated humidity, the binder composition containing about 5% by weight of biphenyls (Example 4) exhibits improved tensile strength. Specifically, cured compositions containing a mixture of bi- and tri-substituted biphenyls of formula (II) possessed a tensile strength 20% greater than cured conventional compositions when both were subjected to a relative humidity of 90% for 24 hours. At 100% relative humidity, the cured compositions of the invention possessed a tensile strength of 30% greater than cured conventional compositions.

In summary, the tensile performance using cured compositions including biphenyls in the no bake system is quite comparable to the tensile performance of cured conventional compositions; however, in the cold box systems employing bi- and tri-substituted biphenyls an unexpected humidity resistance is realized for the cured composition.

TEST 5

Figure 7:
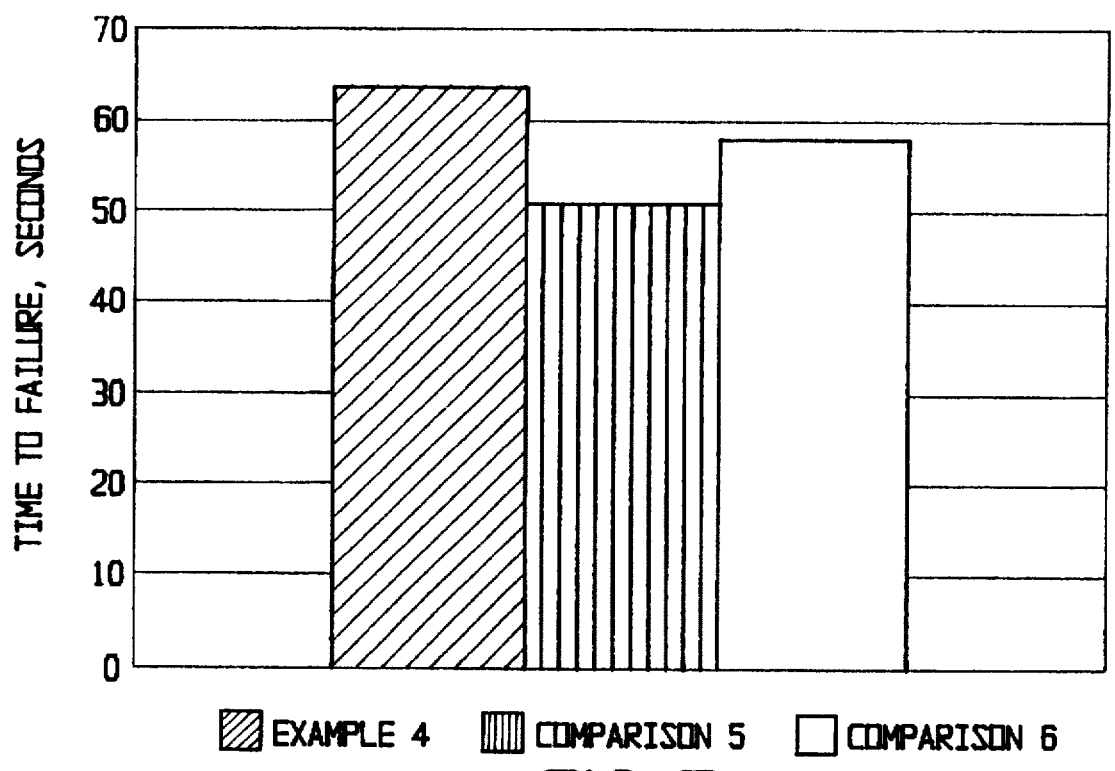
FIG. 7 shows a significantly higher hot strength for a cold-box binder composition containing biphenyl compounds.

Similar to the tests conducted in Test 2, strips 1"×¼"×4½" prepared from the foundry mixtures identified in Example 4 and Comparisons 5–6 were clamped to a support in a cantilever position and strongly heated in the center of one face. FIG. 7 shows bar graphs comparing the failure time of the conventional composition (Comparison 6) to a composition containing glycerol trioleate (Comparison 5) in substitution for like amounts of the mixture of biphenyls as set forth in Example 4. The data clearly demonstrates a significantly longer time to failure (20% longer and 9.4% longer) for compositions of the present invention relative to the conventional composition and to a composition containing glycerol trioleate in substitution for the biphenyl compounds.

TEST 6

Figure 8:
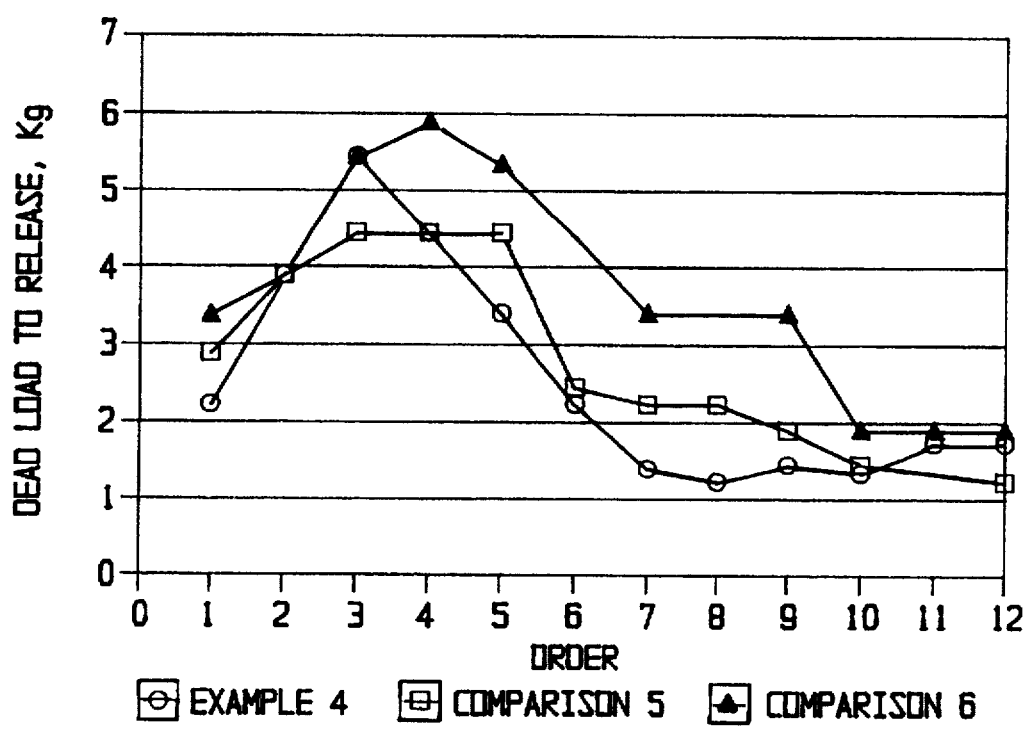
FIG. 8 shows the improved release characteristics of a core formed by the cold-box method wherein biphenyl compounds are included in the binder mixture.

Release characteristics were also tested for Example 4 and Comparisons 5–6 similar to the test as reported in Test 3. However, the test protocol was modified from that used in the no-bake systems. Because of the high immediate tensile strength achieved with a cold box system, cores are removed from the core tube immediately after curing. The binder level is also decreased so that differences in release could be measured. A high binder level will result in release loads that exceed the capacity of the test apparatus. FIG. 8 compares the release rate measured for the cold box Example 4 and Comparisons 5–6 tested. As shown, the system containing the biphenyl mixture of the invention generally improved release over the other two systems tested.

Figure 9:
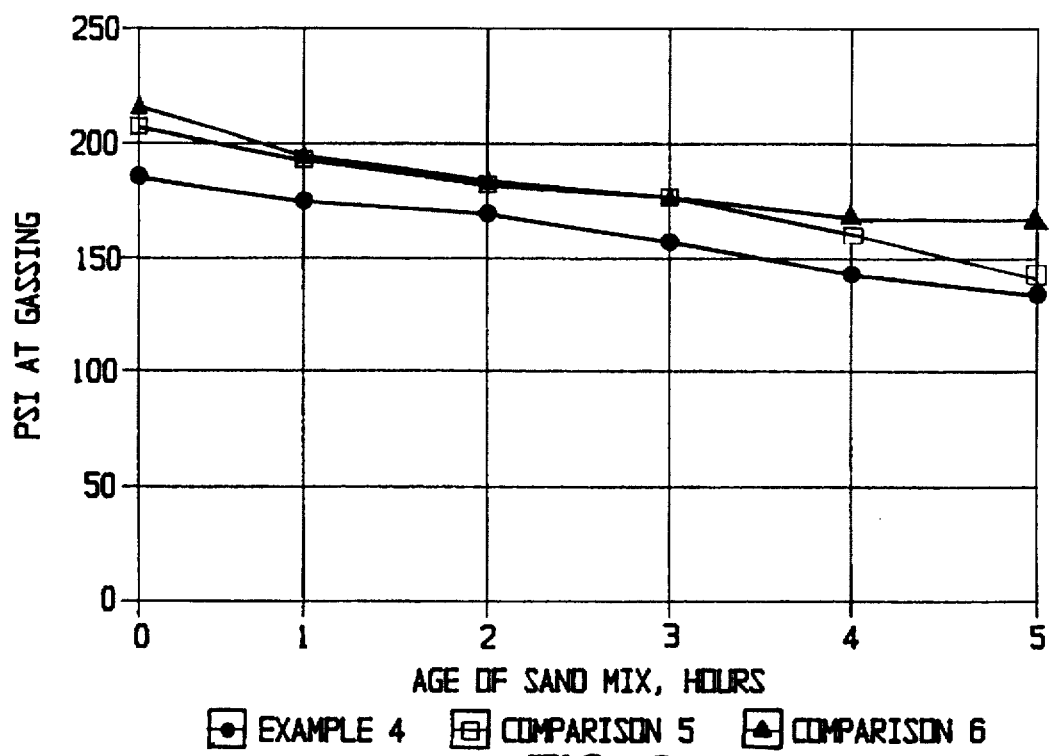
FIG. 9 shows no loss of bench life of mixed sand as the result of the presence of biphenyl compounds.
Figure 10:
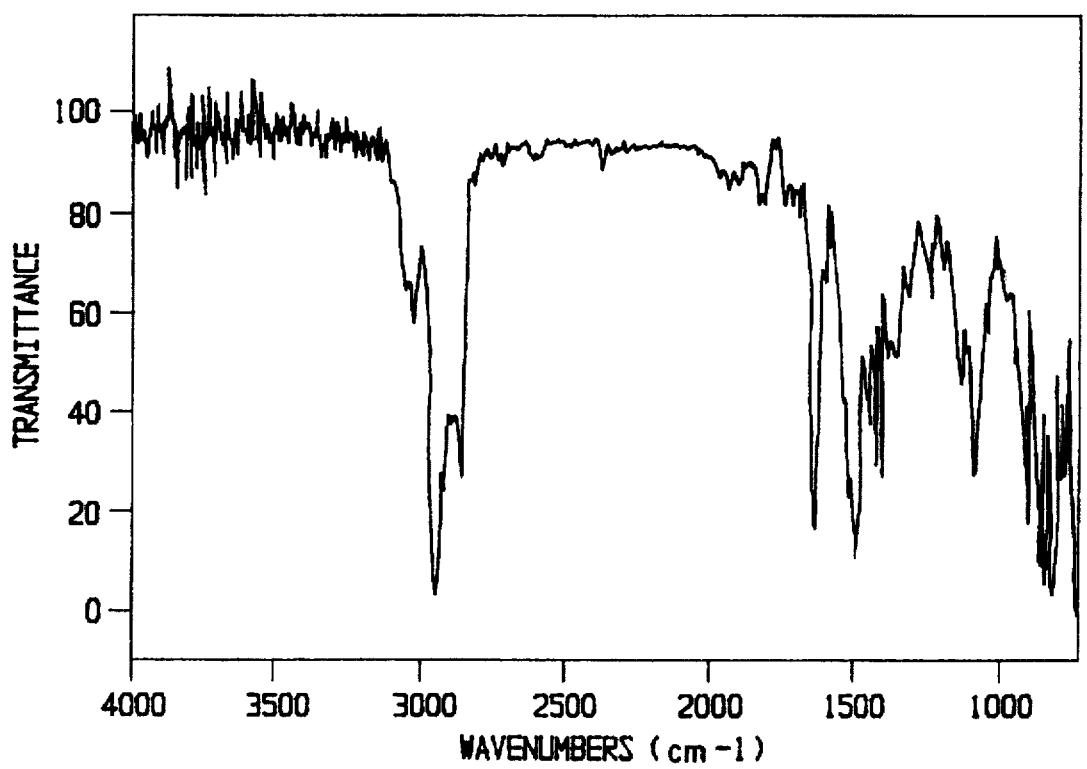
FIG. 10 is the Fourier transformed I.R. spectrum for the composition of a mixture of biphenyl compounds sold under the trademark Sure-Sol® 300.

A final comparison was presented regarding the performance of the urethane cold box systems. FIG. 9 shows that there was essentially no effect on the bench life of mixed sand containing the biphenyl compounds of the present invention.

As seen from the data above, the use of a biphenyl component in urethane in the cold-box system presents no real disadvantages but achieves significant advantages in hot strength and humidity resistance as well as mold release.

The following additional examples and tables further establish the advantages and properties of the present invention.

In Table 3 the composition of Example 7 includes 2.0% of the biphenyl of the present invention in a part one component.

TABLE 3

Cold-Box Formulations

| Base Resin (Part 1) | Control 60% | Example 7 Biphenyl-Containing 60% | Comparison 8 60% | Comparison 9 60% |
|---|---|---|---|---|
| SS205 | 26.5 | 26.5 | 26.5 | 24.5 |
| EEP[6] | 11.0 | — | — | — |
| DBE[7] | — | 11.0 | 11.0 | 12.0 |
| Flexricin[8] | 1.5 | — | 1.5 | 1.5 |
| Oleic Acid | 0.5 | — | 0.5 | 0.5 |
| SS 300 | — | 2.0 | — | — |
| Silane | 0.5 | 0.5 | 0.5 | 0.5 |
| Glycerol Trioleate | — | — | — | 1.0 |

[6]ethyl-3-ethoxypropionate
[7]mixture of dibasic esters
  a. dimethyl adipate
  b. dimethyl glutarate
  c. dimethyl succinate
[8]castor oil derivative The above example composition and comparison compositions were mixed for a time sufficient to achieve a uniform composition as described above with respect to Example 4 and Comparisons 5–6. Thereafter identical part-two components in like amounts were added to the sand mixtures and mixed. Uniformly coated sand mixtures were charged into molds, contacted with tertiary amine catalysts to produce dog-bone test cores and these cores were allowed to cure and were then subjected to tensile tests as described above. The composition of Example 7 and the Example 10 and 11 compositions that follow include a biphenyl component of the present invention in part one components in amounts of about 0.5–2.0%. In these amounts additional benefits are obtained as discussed infra.

TABLE 4

Tensile Results

| | Control | Example 7 Biphenyl | Comparison 8 | Comparison 9 |
|---|---|---|---|---|
| 1 min.* | 213 psi | 221 psi | 216 psi | 216 psi |
| 1 hr.* | 313 | 344 | 307 | 314 |
| 24 hr.+ | 332 | 372 | 323 | 323 |
| 24 hr./ 90% RH+ | 193 | 204 | 188 | 193 |
| 24 hr./ 100% RH+ | 107 | 135 | 110 | 107 |

*averages for six samples
+averages for three samples

The results indicate that incorporation of the biphenyl substitute in a part one component can be made. The results also surprising show that improvements in tensile strength over the testing time period are achieved by reducing the amount of biphenyl component. The improvement is even obtained at relative humidities of 90 and 100% relative to compositions containing conventional plasticizers and solvents.

TABLE 5

Cold Box Formulations

| | Control % | Example 10 Biphenyl Containing % |
|---|---|---|
| Base Resin Part 1 | 59 | 59 |
| Dioctyl adipate | 8.78 | 8.78 |
| SS-205 | 21.53 | 21.53 |
| DBE-9 | 8.78 | 8.78 |
| Flexricin | 1.44 | — |
| Oleic Acid | 0.47 | 0.47 |
| SS-300 | — | 1.44 |

The part one components shown in Table 5 were mixed with sand and a conventional part two component was added to the sand mixture. The completed mixture was charged to dog-bone core molds, and contacted with a catalytic gas mixture as is conventional. The samples were then subjected to tensile testing at various time intervals as discussed above and the results are reported below:

TABLE 6

Tensile Results

| | Control | Example 10 Bi-Phenyl-Containing |
|---|---|---|
| 1 min.* | 208 psi | 226 psi |
| 1 hr.* | 327 | 350 |

TABLE 6-continued

Tensile Results

|  | Control | Example 10 Bi-Phenyl-Containing |
|---|---|---|
| 24 hr.* | 370 | 380 |
| 24 hr./90% RH+ | 165 | 200 |
| 24 hr./100 RH+ | 112 | 125 |

*Data is the average of six samples
+Data is the average of three samples

Again improved results are reported over the entire cure testing period.

Cold-Box Formulation

Four additional sand mixtures were prepared having compositions similar to the composition shown in Table 3, and for convenience the compositions of Table 3 are reproduced in Table 7.

TABLE 7

Cold-Box Formulations

| Base Resin (Part 1) | Control 60% | Example 7 Biphenyl- Containing 60% | Comparison 8 60% | Comparison 9 60% |
|---|---|---|---|---|
| SS205 | 26.5 | 26.5 | 26.5 | 24.5 |
| EEP[6] | 11.0 | — | — | — |
| DBE[7] | — | 11.0 | 11.0 | 12.0 |
| Flexricin[8] | 1.5 | — | 1.5 | 1.5 |
| Oleic acid | 0.5 | — | 0.5 | 0.5 |
| SS 300 | — | 2.0 | — | — |
| Silane | 0.5 | 0.5 | 0.5 | 0.5 |
| Glycerol Trioleate | — | — | — | 1.0 |

[6]ethyl-3-ethoxypropionate
[7]mixture of dibasic esters
 a. dimethyl adipate
 b. dimethyl glutarate
 c. dimethyl succinate
[8]castor oil derivative

TEST 7

These mixtures were mixed as described in Example 7 above, and placed in a humidity chamber without contact with a catalyst at intervals of thirty minutes, one hour, two hours, and three hours. Samples are blown into standard dogbone cores and cured with a catalyst for one minute. The cured dogbone cores were then subjected to standard tensile tests.

The results are as follows:

TABLE 8

|  | Control | Example 7 (biphenyl) | Comparative Exp. 8 | Comparative Exp. 9 |
|---|---|---|---|---|
| 30 min. | 212 psi | 222 psi | 199 psi | 199 psi |
| 1 hour | 137 | 150 | 123 | 103 |
| 2 hours | —* | 85 | 42 | —* |
| 3 hours | —* | 17 | —* | —* |

*not blowable

In view of the data immediately above and data set forth in earlier tables, specifically Tables 4 and 6, it is shown that the biphenyl component clearly is protecting the uncured foundry mixtures, and cured samples in cold-box urethane systems, from the negative effects of humidity.

TEST 8

Test 8 shows the upper limits of the amount of biphenyl included in a urethane binder mixture.

A part one base resin, as described in U.S. Pat. No. 5,189,079, was prepared. Various compositions containing 20% by weight of the resins were prepared and solubility observations for such compositions are reported below:

|  | Observation |
|---|---|
| Composition A |  |
| 20% base resin 80% Sure Sol® 300 | Would not go into solution |
| Composition B |  |
| 60% Sure Sol® 300 20% DBE-9 20% base resin | Somewhat milky Goes into solution |
| Composition C |  |
| 75% Sure Sol® 300 5% methanol 20% base resin | Somewhat milky Goes into solution |
| Composition D |  |
| 75% Sure Sol® 300 5% tetrahydrofuran 20% base resin | Would not go into solution |

Composition E was prepared containing 80% Sure Sol® 300 and 20% of a modified base resin containing hydroxy end groups. This composition was somewhat cloudy but went into solution.

Eighty percent by weight of Compositions B, C and E were then combined with 20% by weight of a methylenebiphenyl diisocyanate part two component as described in U.S. Pat. No. 5,189,079. In each instance, in the presence of 1 gram of commercially available urethane catalyst the mixtures cured forming solid polyurethane plugs.

The experiments indicate that it is predictable and possible to use amounts of the biphenyl component in urethane binder systems in the upper ranges as reported.

An additional experiment was conducted to show efficacy at the lower reported range for the biphenyl component. The following compositions were prepared:

TABLE 9

|  | Example 11 (%) | Comparison 12 (%) |
|---|---|---|
| Part I - base resin | 59 | 59 |
| DOA* | 8.75 | 8.75 |
| SS205 | 21.5 | 21.5 |
| DBE-9 | 8.75 | 8.75 |
| Flexricin | 1.0 | 1.5 |
| Oleic acid | 0.5 | 0.5 |
| Sure Sol 300 | 0.50 | — |

*Dioctyladipate

Fifty parts by weight based on a complete urethane binder system of part one components, as described above, were mixed with foundry sand and fifty parts by weight based on a complete urethane binder system of part two components as described in Exp. 4 to form polyurethane foundry compositions.

Dogbone biscuits were blown and cured as described above and tensile strength tests conducted. The results are reported below:

TABLE 10

|  | Example 11 | Comparison 12 |
|---|---|---|
| 1 min. | 210 psi | 200 psi |
| 24 hours at 100% humidity | 183 | 172 |
| In desiccators for 24 hours at room temperature | 370 | 347 |

Example 11 shows improvements in the tensile strength of cold box formulations even at the lowest herein reported range of use of biphenyls. Of course, it is envisioned that improvements may be had at even lower percentages of biphenyls relative to compositions not containing biphenyls; however, the tensile results reported for Exp. 11 are not as good as the results reported for Example 4 where greater amounts of the biphenyl component is used.

Final experiments indicate that the biphenyl component can be used as a true third component and need not be incorporated into either a part one or part two component.

TABLE 11

|  | Wt. % | Grams |
|---|---|---|
| Base Resin/Part I | 59 | 118 |
| DOA | 8.75 | 17.5 |
| SS205 | 21.5 | 43 |
| DBE-9 | 8.75 | 17.5 |
| Flexricin 100 | 7.5 | 3.0 |
| Oleic acid | .5 | 1 |
| Silane | 0 | 0 |

To a Kitchen Aid mixer was added 2500 grams of lake sand. The mixer was started and the part one component of Table 11 and a polymeric methylenebiphenyl diisocyanate solution as described in U.S. Pat. No. 5,189,079 were added to the mixing sand. A biphenyl of formula II was added in amounts of 1.5% by weight of the mixture as a third component.

Dogbone briquettes were blown as before and cured and subjected to tensile tests. The tensile strength results at 1 minute, 24 hours at 90% relative humidity, 24 hours at 100% relative humidity and 24 hours at room temperature in a desiccator are reported below:

| 1 min. | 213 psi |
|---|---|
| 24 hours/90% relative humidity | 207 |
| 24 Hours/100% relative humidity | 135 |
| 24 hours, desiccator/room temperature | 365 |

These results compare favorably with the results reported for Example 7, especially when compared to exposures of 24 hours at 90% and 100% relative humidity.

As discussed above, biphenyl itself or monosubstituted, or multisubstituted biphenyls alone or in admixture can be used in components of the invention to obtain improvements in resin binder systems. Results using such other compounds and compositions are discussed below.

The following additional no bake compositions were prepared in the manner as described for Example 1 and comparisons 2–3 above, except that various other "biphenyls" were used as components of the composition.

TABLE 12

Formulations of various part 2 resins wherein the compositions of the invention contain biphenyls:

|  | Controls 1 & 2 | Exp. 13 | Exp. 14 | Exp. 15 | Exp. 16 | Exp. 17 | Exp. 18 |
|---|---|---|---|---|---|---|---|
| % P-MDI | 71 | 71 | 71 | 71 | 71 | 71 | 71 |
| % "biphenyl" |  | 10$^a$ | 10$^b$ | 10$^c$ | 10$^d$ | 10$^e$ | 10$^f$ |
| % Sure-Sol 150 ND | 27 | 17 | 17 | 17 | 17 | 17 | 17 |
| % TXIB | 2 | 2 | 2 | 2 | 2 | 2 | 2 |

$^a$phenylbenzene
$^b$a mixture of phenylbenzene and methyl biphenyl (Sure-Sol 175)
$^c$isopropyl biphenyl (Sure-Sol 250)
$^d$ethyl biphenyl (Sure Sol 275)
$^e$sec-butylbiphenyl (Sure Sol 290)
$^f$a mixture of diisopropylbiphenyls wherein one compound of the mixture is bisubstituted on a single ring and the two rings of the second compound of the mixture are monosubstituted (Sure Sol 330)

The tensile strength of dog bone core samples of the above compositions were tested and the results are reported below. In Tables 13 and 14 below it is pointed out that the control samples are of the same composition; the tests were just conducted at different times.

TABLE 13

Tensile Strength (psi) data for composition with various biphenyls

| Age of Core | Control | Exp. 13 | Exp. 14 | Exp. 15 |
|---|---|---|---|---|
| 10 min. | 160 | 150 | 158 | 162 |
| 1 hour | 297 | 265 | 293 | 257 |
| 24 hours | 252 | 282 | 273 | 325 |
| 24 hours/90% relative humidity | 137 | 165 | 157 | 167 |

TABLE 14

Tensile strength (psi) data for compositions with various biphenyls

| Age of Core | Control | Exp. 16 | Exp. 17 | Exp. 18 |
|---|---|---|---|---|
| 10 min. | 148 | 150 | 168 | 165 |
| 1 hour | 288 | 287 | 290 | 288 |
| 24 hours | 225 | 263 | 253 | 248 |
| 24 hours/90% relative humidity | 90 | 112 | 107 | 95 |

As is seen from these tables improved tensile strengths are achieved using biphenyl compositions of the invention.

TABLES 15 and 16 report the results of dead weight release tests for controls and Exp. 13–18.

TABLE 15

Dead Weight Release (g) with various biphenyls

| Core Set Time in Core Tube | Control | Exp. 13 | Exp. 14 |
|---|---|---|---|
| 1 min. | 3421 | 2421 | 2221 |
| 5 min. | 6221 | 4421 | 4721 |
| 30 min. | 7621 | 6121 | 6721 |

TABLE 16

Dead Weight Release (g) with various biphenyls

| Core Set Time in Core Tube | Control | Exp. 15 | Exp. 16 | Exp. 17 | Exp. 18 |
|---|---|---|---|---|---|
| 1 min. | 3721 | 1621 | 1521 | 1521 | 1621 |
| 5 min. | 5821 | 2821 | 2621 | 2761 | 2761 |
| 30 min. | 8121 | 6021 | 6621 | 6621 | 6621 |

These results establish that various "biphenyls" improve the release characteristics of cores produced in accordance with the invention.

As discussed above it is preferable that the part one component of the binder is a polyol containing a phenol formaldehyde resin; however, it is possible to prepare a binder that contains a non-phenol formaldehyde polyol part one resin, i.e., one containing significant amounts of a polyether polyol which is a polymer of propylene oxide and bis (((2-hydroxyethyl)amino)methyl) phenol sold by Eastman Chemical Company under the name THANOL R-350X Polyol as product number 26524. A part one component containing 35.90 by weight of this polyol is formulated with 11.99% of di-iso-butyl phthalate, 15.80% of a second polyether polyol, PELRON 9338 sold by the Perlon Corporation and 36.31% of Sure Sol 150ND.

This part one component was combined with a part two component containing Sure Sol 300 in various percentages, as shown in Table 17 below.

TABLE 17

Binder formulations containing various Sure Sol 300 percentges and a non-phenolic polyol part 1 resin.

| Composition | Exp. 19 | Exp. 20 | Exp. 21 |
|---|---|---|---|
| % P-MDI | 71 | 71 | 71 |
| % Sure Sol 300 | 1 | 5 | 10 |
| % Sure Sol 150 ND | 26 | 22 | 17 |
| TXIB | 2 | 2 | 2 |

The tensile strength of dog bone core samples of the above compositions were tested and the results are reported below. In Tables 18 and 19 below it is pointed out that the Control samples are of the same composition; the tests were just conducted at different times.

TABLE 18

Tensile strength (psi) with varying amounts of Sure-Sol 300

| Age of Core | Control | Exp. 19 |
|---|---|---|
| 10 min. | 235 | 150 |
| 1 hour | 312 | 287 |
| 24 hours | 305 | 263 |
| 24 hours/90% relative humidity | 67 | 112 |

TABLE 19

Tensile strength (psi) with varying amounts of Sure-Sol 300

| Age of Core | Control | Exp. 20 | Exp. 21 |
|---|---|---|---|
| 10 min. | 297 | 282 | 307 |
| 1 hour | 325 | 325 | 360 |

TABLE 19-continued

Tensile strength (psi) with varying amounts of Sure-Sol 300

| Age of Core | Control | Exp. 20 | Exp. 21 |
|---|---|---|---|
| 24 hours | 360 | 362 | 358 |
| 24 hours/90% relative humidity | 92 | 78 | 87 |

As is seen from these tables improved tensile strengths are achieved using biphenyl compositions of the invention which do not include phenolic containing part one components.

TABLE 20 reports the results of dead weight release tests for controls and Exp. 19–21.

TABLE 20

| Core Set Time in Core Tube | Control | Exp. 19 | Exp. 20 | Exp. 21 |
|---|---|---|---|---|
| 1 min. | 2921 | 2321 | 2021 | 1321 |
| 5 min. | 6721 | 6321 | 5521 | 4221 |
| 30 min. | 8721 | 7821 | 6921 | 6121 |

These results establish that non-phenol formaldehyde polyol resins can also be used in binder compositions of the invention.

Thus, it is apparent that there has been provided, in accordance with the present invention, a method for improving characteristics of a foundry binder composition that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to include all such alternatives, modifications and variations as set forth within the spirit and scope of the appended claims.

What is claimed is:

1. A core or mold comprising: sand and a polyurethane binder and at least one biphenyl additive of the following formula

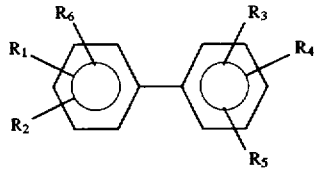
[I]

wherein $R_1$, $R_2$, $R_3$, $R_4$, $R_5$ and $R_6$, which may be the same or different, are selected from the group consisting of H and $C_1$–$C_6$ branched and unbranched alkyl and alkenyl substituents, with the provision that when $R_1$–$R_6$ is each hydrogen the additive is present in amounts of greater than about 0.25% by weight of the binder or such an additive is used in combination with at least one other biphenyl within the above definition.

2. A core or mold comprising: sand and a polyurethane binder and at least one biphenyl additive of the following formula

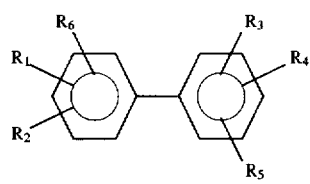
wherein $R_1$, $R_2$, $R_3$, $R_4$, $R_5$ and $R_6$, which may be the same or different, are selected from the group consisting of H and $C_1$–$C_6$ branched and unbranched alkyl and alkenyl substituents, present in amounts of about 0.25% or greater by weight of the binder to improve the humidity resistance, mold release and hot-strength of the mold or core.
* * * * *